United States Patent [19]
Sasaki et al.

[11] Patent Number: 6,067,612
[45] Date of Patent: May 23, 2000

[54] DISTRIBUTED PROCESSING TYPE CONTROL SYSTEM

[75] Inventors: Akihiro Sasaki, Anjo; Yasushi Kanda, Kariya; Kazunori Sakai, Nishikamo-gun; Akihiro Tanaka, Anjo, all of Japan

[73] Assignee: Denso Corporation, Kariya, Japan

[21] Appl. No.: 09/111,763

[22] Filed: Jul. 8, 1998

[30] Foreign Application Priority Data

Jul. 9, 1997 [JP] Japan .................................. 9-183568

[51] Int. Cl.⁷ ................................................ G06F 15/167
[52] U.S. Cl. .................................................. 712/28; 701/48
[58] Field of Search .............................. 709/201; 712/28; 701/48

[56] References Cited

U.S. PATENT DOCUMENTS

| | | | |
|---|---|---|---|
| 5,091,856 | 2/1992 | Hasegawa et al. | 701/36 |
| 5,467,277 | 11/1995 | Fujisawa et al. | 701/51 |
| 5,513,107 | 4/1996 | Gormley | 701/48 |
| 5,771,174 | 6/1998 | Spinner et al. | 700/129 |
| 5,835,873 | 11/1998 | Darby et al. | 701/45 |

FOREIGN PATENT DOCUMENTS

| | | |
|---|---|---|
| 2-003559 | 1/1990 | Japan . |
| 2-249738 | 10/1990 | Japan . |
| 3-135853 | 6/1991 | Japan . |
| 5-286396 | 11/1993 | Japan . |
| 6-131267 | 5/1994 | Japan . |
| 6-219187 | 8/1994 | Japan . |
| 6-282455 | 10/1994 | Japan . |
| 2273580 | 6/1994 | United Kingdom . |

*Primary Examiner*—Kenneth R. Coulter
*Attorney, Agent, or Firm*—Pillsbury Madison & Sutro LLP

[57] ABSTRACT

A relaying controller communicates with an external tool through a first communication path based on a first communication protocol and communicates with sub-controllers through a second communication path based on a second communication protocol, thus relaying communications between the external tool and the sub-controllers. The relaying controller includes a rewritable non-volatile memory having predetermined storage areas divided in correspondence with the sub-controllers. The relaying controller transmits, in response to a memory reading request from the sub-controller, a stored data in the corresponding storage area to the sub-controller through the second communication path, and writes, in response to a memory writing request from the sub-controller, a writing data received through the second communication path in the corresponding storage area. That is, the relaying controller executes accesses of the sub-controllers to the non-volatile memory.

6 Claims, 6 Drawing Sheets

DISTRIBUTED PROCESSING TYPE CONTROL SYSTEM

CROSS REFERENCE TO RELATED APPLICATION

This application relates to and incorporates herein by reference Japanese Patent Application No. 9-183568 filed on Jul. 9, 1997.

BACKGROUND OF THE INVENTION

1. Field of the Invention

The present invention relates to a distributed processing type control system and, more particularly to a distributed processing type control system which is capable of executing a programmable control by writing control data in a rewritable non-volatile memory such as an EEPROM.

2. Description of Related Art

There is known a fully distributed processing type control system which has a plurality of sub-controllers for controlling individually a plurality of local devices different from each other.

Japanese Laid-open Patent Publication No. 6-219187 discloses a master-slave distributed processing type control system. In this apparatus, a plurality of sub-controllers which share partial controls different from each other are connected through respective exclusive lines to a master controller which executes supervising control for the sub-controllers. The master controller stores therein vehicle control characteristics parameters corresponding to a plurality of drivers, and selects and commands to the sub-controller one of the vehicle control characteristics parameters in correspondence with a specified one of the drivers.

In this fully distributed processing type control system, when an external tool such as a diagnosing device or a teaching device collects data from each sub-controller or issues a command to each sub-controller, it is required to execute each time a communication between the external tool and each sub-controller through a serial bus, for instance.

More specifically, in this fully distributed processing type control system, each sub-controller is required to have its own operational function of communication with the external tool. In the case that the sub-controller is designed to execute a control variably, each sub-controller is required to have its own non-volatile memory for the variable control. Thus, the size of the entire control system will expand remarkably as the number of sub-controllers increases.

In the above master-slave distributed processing type control system, the external tool is required only to execute the communication with the master controller, because the master controller manages distribution of control programs of the sub-controllers and collects diagnosis data in a centralized supervising manner. In this system, however, it is likely that the master controller will be required to have an increased control size and an increased communication processing, because the master controller supervises all the sub-controllers individually. Further, it is also likely that the failure in the master controller will lessen the entire operational function of the system. Still further, in a vehicle control system, it may be required that each sub-controller has its own specification or is different depending on the type of vehicle. Thus, the specification of the master controller must be changed accordingly.

SUMMARY OF THE INVENTION

It is therefore an object of the present invention to provide a distributed processing type control system which has a simple construction and less communication processing for each controller.

It is another object of the present invention to provide a distributed processing type control system which enables changes to its specification.

According to a distributed processing type control system of the present invention, a relaying controller (relay controller) communicates with an external tool through a first communication path based on a first communication protocol and communicates with each of sub-controllers through a second communication path based on a second communication protocol. That is, the relaying controller relays communications between the external tool and the sub-controllers.

The relaying controller includes a rewritable non-volatile memory which is divided into predetermined storage areas in correspondence with each of the sub-controllers. The relaying controller transmits, in response to a reading access, i.e., memory reading request, to the storage area from each sub-controller, a stored data in the corresponding storage area to the sub-controller through the second communication path, and writes, in response to a writing access, i.e., memory writing request, to the storage area from the sub-controller, a writing data received through the second communication path in the corresponding storage area. That is, the relaying controller executes access of each sub-controller to the non-volatile memory, thus managing a common non-volatile memory.

As the common non-volatile memory is provided in the relaying controller which has the above relaying operational function between the external tool and the sub-controllers, the relaying controller and the sub-controllers are required only to communicate on the same communication path based on the same communication protocol as that of the relaying time in response to the common non-volatile memory access from the sub-controller. Though the non-volatile memory is centralized and the communication between the external tool and each sub-controller is executed thus, the relaying controller is required only to have the relaying function and the non-volatile memory accessing function. As a result, the relaying controller can be simplified in both construction and processing.

Further, as each sub-controller uses the non-volatile memory of the relaying controller, the sub-controller is not required to have its own non-volatile memory resulting in simplified circuit configuration.

In addition, each sub-controller is not required to have dual combinations of a communication path and a communication circuit, one combination being a communication path for realizing a communication with the external tool and a communication circuit for executing the communication and the other combination being a communication path for realizing a communication between the sub-controllers or a communication with a predetermined supervising processing type controller and a communication circuit for executing the communication. Thus, both the sub-controller and the processing are simplified remarkably.

Further, the relaying controller executes only relaying operation. Therefore, even in the case that the number of sub-controllers or the specification of each sub-controller is changed in dependence on the type of vehicle, the internal specification of the relaying controller is not required to be changed correspondingly.

Still further, the external tool is enabled to execute a communication as if it communicates directly with each sub-controller. Thus, the external tool is generalized with ease.

Preferably, in the distributed processing type control system, the relaying controller further controls a local device. Thus, the relaying controller is enabled to control the local devices during a time period in which no data relaying operation is necessitated, thus simplifying the construction still further.

BRIEF DESCRIPTION OF THE DRAWINGS

Other objects, features and advantages of the present invention will be made more apparent by the following detailed description with reference to the accompanying drawings. In the accompanying drawings.

DETAILED DESCRIPTION OF THE PREFERRED EMBODIMENT

A distributed processing type control system according to the present invention is described further in detail with reference to an embodiment of a vehicle control apparatus.

Figure 1:
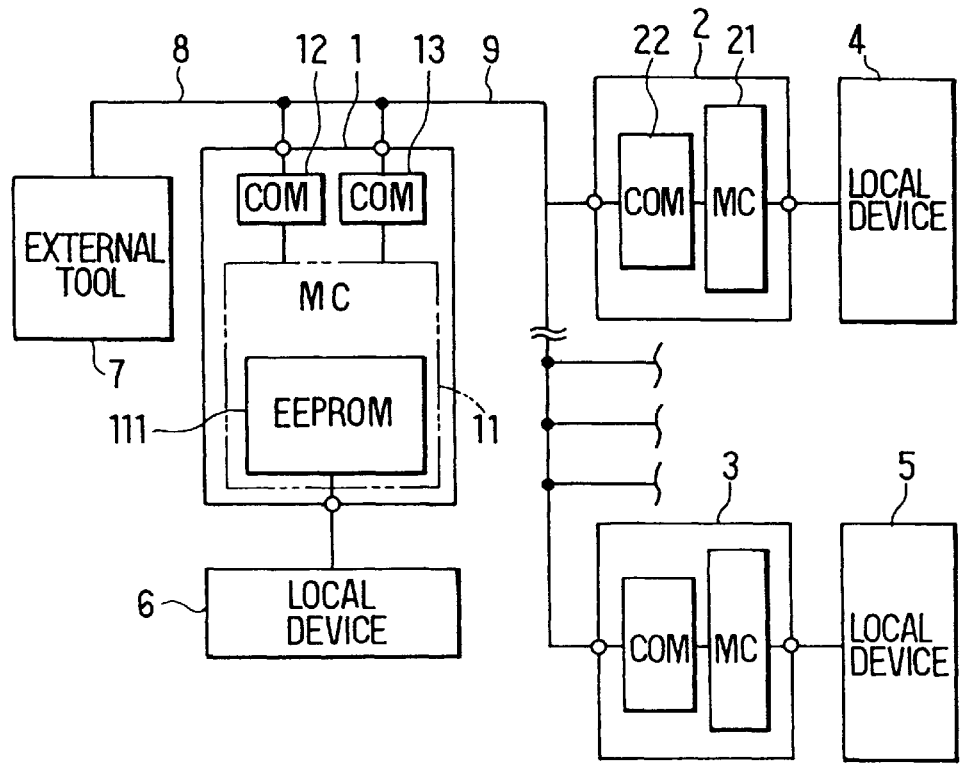
FIG. 1 is a block diagram of a vehicle control system embodying a distributed processing type control system according to the present invention.

In FIG. 1, numeral 1 designates a relaying controller (relay controller), 2 a first sub-controller, 3 an N-th sub-controller, 4 a first local device, 5 an N-th local device, 6 an M-th local device, 7 an external tool, and 8 and 9 serial buses. In this embodiment the relaying controller 1 and the sub-controllers 2, 3 are kept supplied with electric power from a vehicle battery (not shown).

A number of sub-controllers (not shown) having the same construction as the sub-controllers 2, 3 are connected to the serial bus 9 as the sub-controllers 2, 3 are. Those sub-controllers (not shown) also control individually a number of local devices (not shown) other than local devices 4–6.

The relaying controller 1 includes a microcomputer (MC) 11 and communication circuits (COM) 12, 13. The microcomputer 11 includes an EEPROM 111 which is non-volatile. The sub-controller 2 includes a microcomputer 21 and a communication circuit 22. The microcomputer 21 in this embodiment includes no EEPROM. Other sub-controllers have the same circuit construction as the sub-controller 2. The microcomputer 11 in the relaying controller 1 controls the local device 6, while the sub-controllers 2, 3 control the local devices 4, 5, respectively.

Each of the local devices 4–6 and other local devices (not shown) comprises a vehicle-mounted devices which are capable of being electronically controlled or producing signal output. Those local devices are constructed to be controlled individually by the sub-controllers having different control functions such as an engine control, air conditioner control and lighting control. The vehicle chassis control is executed by the relaying controller 1 through the local device 6.

The external tool 7 comprises a diagnosing device for diagnosing data from the controllers 1–3 or a setting device for setting control constants or control programs to the controllers 1–3.

The EEPROM 111 has a number of divided storage areas for storing therein the control programs and control constants for the local devices 4–6 and other local devices.

The communication circuit 12 of the relaying controller 1 is connected between an I/O circuit (not shown) of the microcomputer 11 and the serial bus 8 (first communication path). It communicates with the external tool 7 through the serial bus 8 based on a first communication protocol and transmits signals received from the external tool 7 to the microcomputer 11. It further transmits to the serial bus 8 signals received from the microcomputer 11 and addressed to the external tool 7.

The communication circuit 13 of the relaying controller 1 is connected between the I/O circuit (not shown) of the microcomputer 11 and the serial bus 9 (second communication path). It communicates with the sub-controllers 2, 3 and other sub-controllers through the serial bus 9 based on a second communication protocol and transmits signals received from the sub-controllers 2, 3 and other sub-controllers to the microcomputer 11. It further transmits to the serial bus 9 signals received from the microcomputer 11 and addressed to the sub-controllers.

The communication circuit 22 of the sub-controller 2 is connected between an I/O circuit (not shown) of the microcomputer 21 and the serial bus 9. It communicates with the relaying controller 1 (and other sub-controllers) through the serial bus 9 based on the second communication protocol and transmits signals received from the relaying controller 2 (and other sub-controllers) to the microcomputer 21. It further transmits to the serial bus 9 signals received from the microcomputer 21 and addressed to the relaying controller 1 (and other sub-controllers).

Each controller, such as the relaying controller 1 and the sub-controllers 2, 3, controls associated one of the local devices 4–6 based on predetermined control routines stored in the respective in-controller memories. Those control processing will not be described any further because those are known and not relevant to the embodiment.

It is noted in this embodiment that, although the signal transmitting and receiving operation between the communication circuit 12 and the microcomputer 11 within the relaying controller 1 is executed repeatedly in alternation with the above control processing of the microcomputer 11 for controlling the local device 6. It is however possible to execute either one with priority, while executing the other during an idle time period in its communication operation. Similarly, although the signal transmitting and receiving operation between the communication circuit 22 and the microcomputer 21 within the sub-controller 2 is executed repeatedly in alternation with the above control processing of the microcomputer 21 for controlling the local device 4. It is however possible to execute either one with priority, while executing the other during an idle time period in its communication period.

It is assumed for brevity in the embodiment that the communication circuits 12, 13 of the relaying controller 1 and the communication circuit 22 of the sub-controller 2 operate independently of the microcomputers 11, 21. It is of course possible to execute the substantial communication processing by the microcomputers 11, 21 so that the circuit functions of the communication circuits 12, 13, 22 may be simplified.

It is also assumed in the embodiment that the sub-controllers do not communicate with each other and that the serial bus 9 is used for only the communication between the communication circuit 13 of the relaying controller 1 and the communication circuits of the sub-controllers, for instance, the communication circuit 22 of the sub-controller 2.

It is further assumed that the communication circuit in each sub-controller repeats a signal transmitting operation at a predetermined time interval until the communication is successfully attained, in the case that the communication circuit 13 of the relaying controller 1 is busy in communicating with the communication circuit of the other sub-controller.

The present embodiment is characterized in that the relaying controller 1 executes a data communication relaying processing and a common non-volatile memory managing processing as follows.

Data Communication Relaying Processing

Data communication relaying processing is to execute, upon receiving from the external tool 7 a data addressed to the sub-controller, a conversion of the data configuration (data format) of the received data between the two communication protocols and transmit it to the sub-controller. Further, the data communication relaying processing is to execute, upon receiving from the serial bus 9 a data addressed to the external tool 7, a conversion of the data configuration (data format) of the received data between the two communication protocols and transmit it to the external tool 7.

Common Non-volatile Memory Managing Processing

The common non-volatile memory managing processing is to transmit stored data in the corresponding storage area of the EEPROM 111 to the corresponding sub-controller through the serial bus 9, upon receiving a memory reading request from the sub-controller. Further, this managing processing is to write, upon receiving a memory writing request and a writing data from the serial bus 9, the received writing data in the corresponding storage area of the EEPROM 111.

Figure 2:
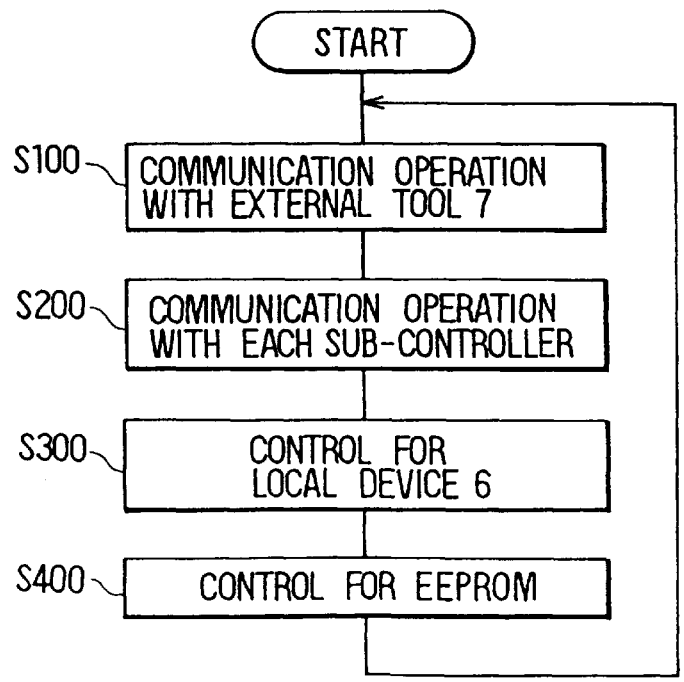
FIG. 2 is a flow chart showing a basic operation of a microcomputer of a relaying controller in the embodiment.

The above control of the microcomputer 11 of the relaying controller 1 is shown generally as its main routine in FIG. 2.

The relaying controller 1 repeats to execute the control processing in the order of a communication operation S100 with the external tool 7, communication operation S200 with each sub-controller 2, control operation S300 for the local device 6 and control operation S400 for EEPROM 111.

Figure 3:
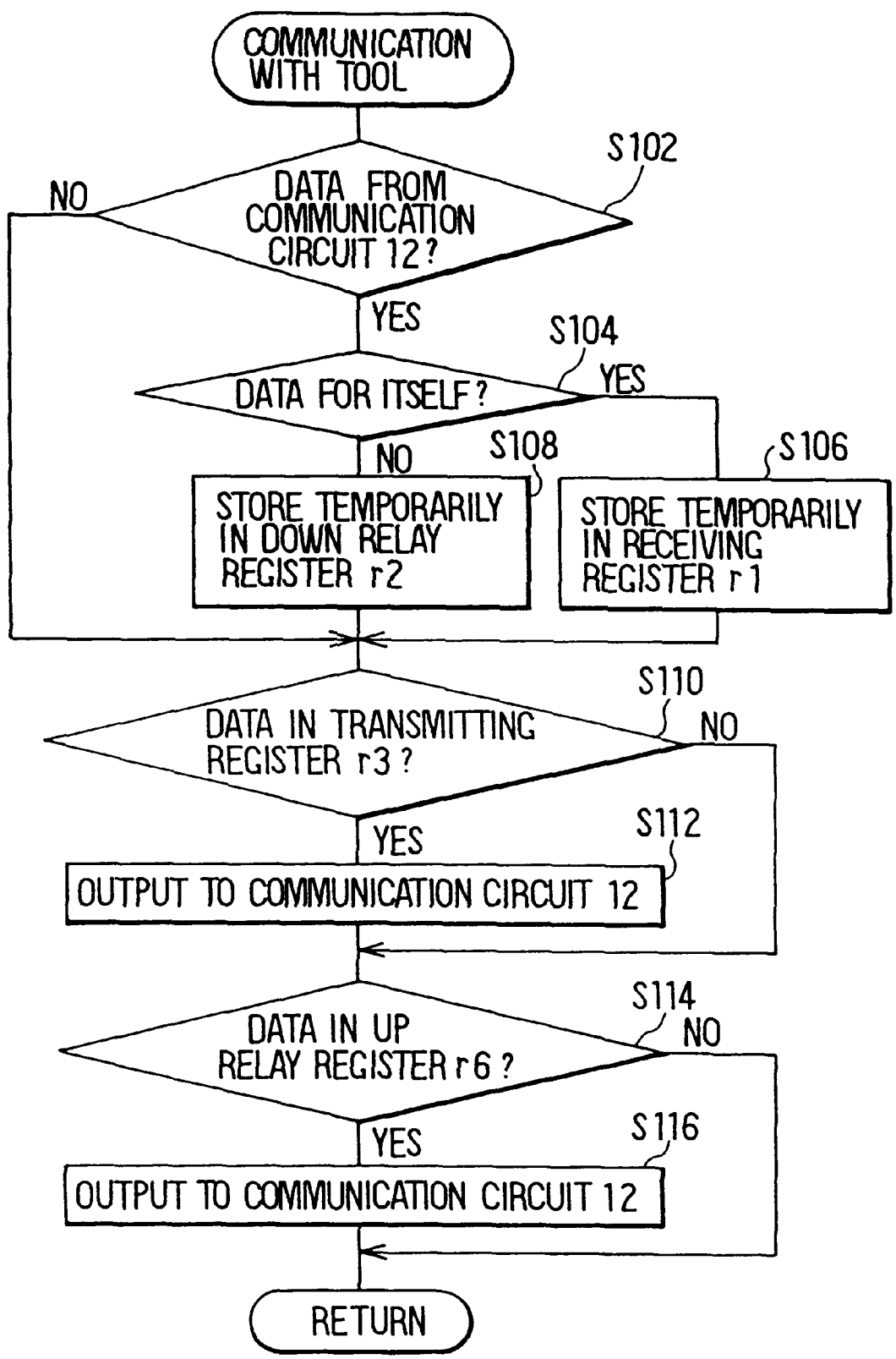
FIG. 3 is a flow chart showing an operation of communication with an external tool in the embodiment.

In the communication operation S100 with the external tool/shown by a flow chart in FIG. 3, it is assumed that the communication circuit 12 communicates with the external tool 7 based on the predetermined first communication protocol and that the data on the serial bus 8 has a first data format.

It is first checked at step S102 whether the communication circuit 12 has received a data from the external tool 7. If not received, the process jumps to step S110. If received, it is checked at step S104 whether this received data is addressed to itself. The received data is stored at step S106 temporarily in its own receiving register r1 if addressed to itself, while the received data is stored at step S108 temporarily in its down relay register r2 if not addressed to itself.

It is checked at the following step S110 whether its own transmitting register r3 has data to be transmitted to the external tool 7. If it has not, the process jumps to step S114. If it has, this transmission data is outputted at step S112 to the communication circuit 12, which in turn transmits it to the external tool 7.

It is checked at the following step S114 whether its own up transmitting register r6 has data to be relayed, i.e., transmission data from the predetermined sub-controller to be relayed to the external tool 7. If it has not, the process returns to the main routine. If it has, this transmission data is outputted to the communication circuit 12, which in turn transmits it to the external tool 7 at step S116.

Figure 4:
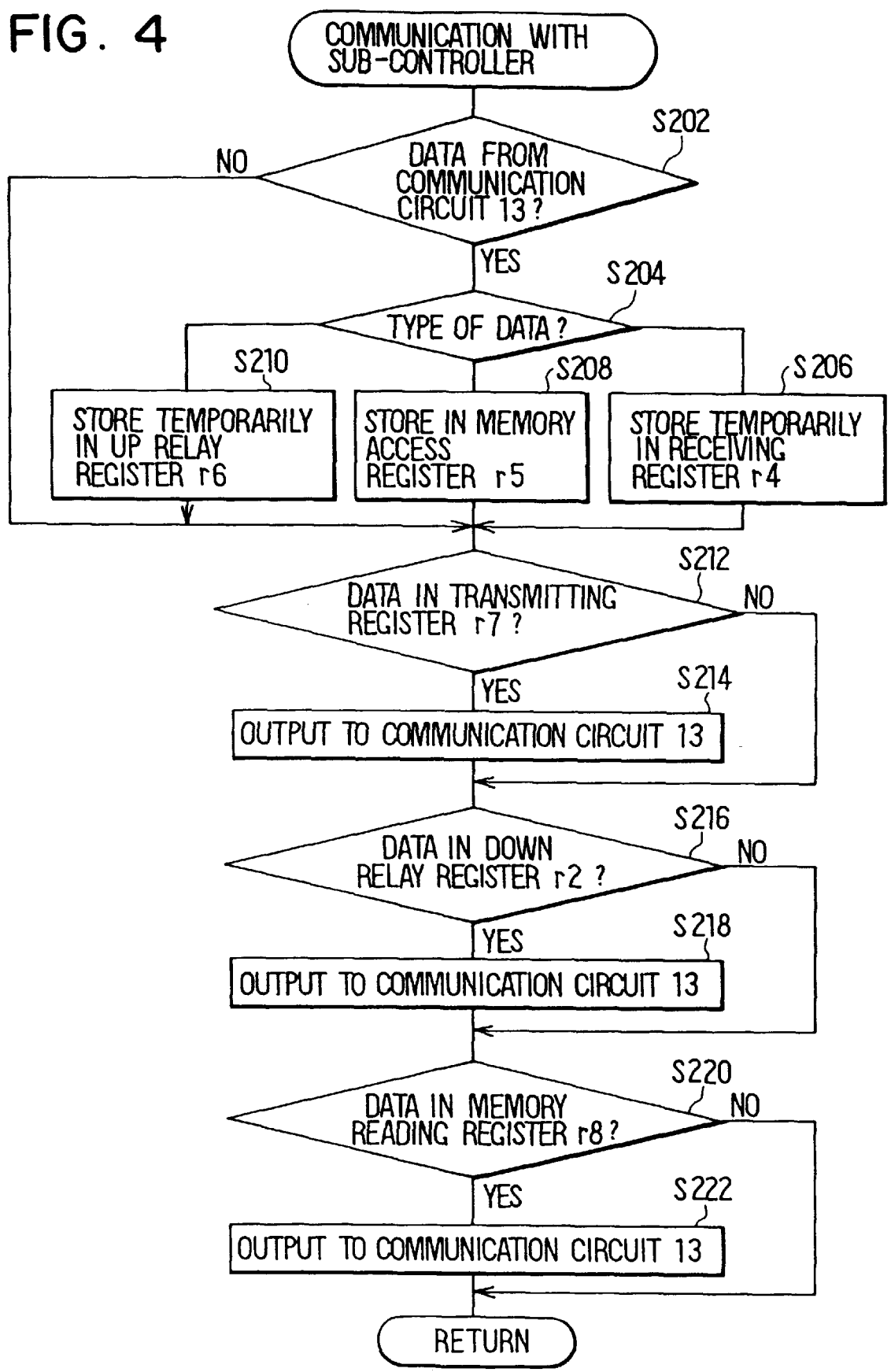
FIG. 4 is a flow chart showing an operation of communication with sub-controllers in the embodiment.

In the communication operation S200 with the sub-controller 2 shown by a flow chart in FIG. 4, it is assumed that the communication circuit 13 communicates with each sub-controller based on the predetermined second communication protocol and that the data on the serial bus 9 has a second data format.

It is first checked at step S202 whether the communication circuit 13 has received data from one of the sub-controllers. If not received, the process jumps to step S212. If received, it is checked at step S204 whether the received data is addressed to itself, the received data (also access request) is addressed to the EEPROM 111, or whether the received data is to be transmitted to the external tool 7. If addressed to itself, it is stored at step S206 temporarily in its own receiving register r6. If addressed to the EEPROM 111 (writing access or reading access), it is stored at step S208 temporarily in its own memory access register r5. If addressed to the external tool 7, it is stored at step S210 temporarily in its own up relay register r6.

It is checked at the following step S212 whether its own transmitting register r7 has data to be transmitted to any one of the sub-controllers. If it has not, the process jumps to step S216. If it has, this transmission data is outputted at step S212 to the communication circuit 13, which in turn transmits it to the corresponding sub-controller through the serial bus 9.

It is checked at the following step S216 whether its own down transmitting register r4 has data (transmission data from the external tool 7 to the predetermined sub-controller). If it has not, the process jumps to step S220. If it has, this relay data is outputted at step S218 to the communication circuit 13, which in turn transmits it to the corresponding sub-controller through the serial bus 9.

It is checked at the following step S220 whether its own memory reading register r8 has data read from the EEPROM 111. If it has not, the process jumps to step S222. If it has, this read data is outputted at step S222 to the communication circuit 13, which in turn transmits it to the corresponding sub-controller through the serial bus 9.

Figure 5:
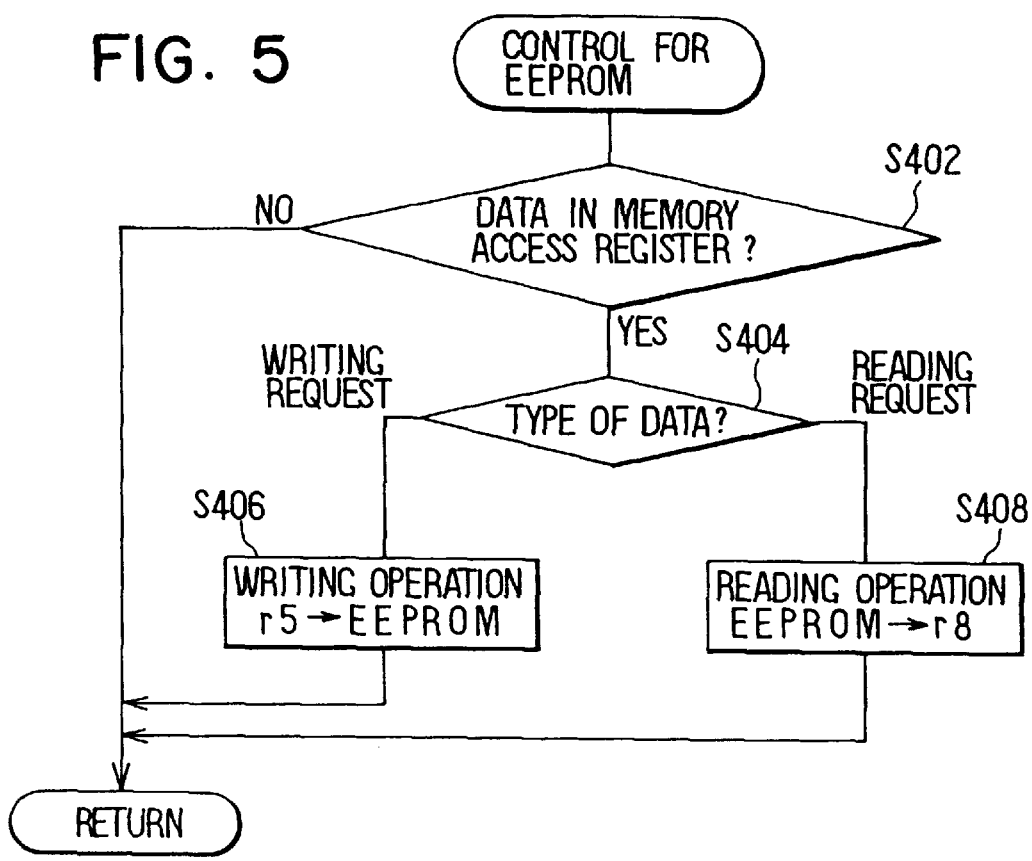
FIG. 5 is a flow chart showing a control operation for an EEPROM in the embodiment.

In the EEPROM control operation S400 executed by the relaying controller 1 shown by a flow chart in FIG. 5, it is first checked at step S402 whether the memory access register r5 has the data (writing request (writing access) or reading request (reading access)). If it has not, the process returns to the main routine shown in FIG. 2. If it has, it is checked at step S404 whether it is the writing access or reading access. In the former case, the data in the memory access register r5 is written in the corresponding storage area of the EEPROM 111. In the latter case, the data in the corresponding area of the EEPROM 111 is read out to the memory access register r5. The process then returns to the main routine.

Figure 6:
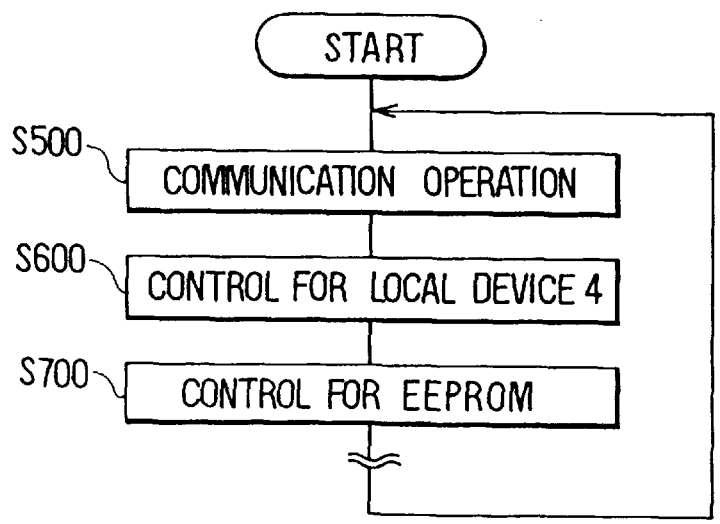
FIG. 6 is a flow chart showing a basic operation of a microcomputer of each sub-controller in the embodiment.

The control processing of the microcomputer 21 of the sub-controller 2 in relation to this embodiment is shown by a flow chart in FIG. 6.

The sub-controller 2 repeats to execute control processing in the order of a communication operation S500 with the external tool 7 and the relaying controller 1, control operation S600 for the local device 4 and EEPROM control operation S700.

Figure 7:
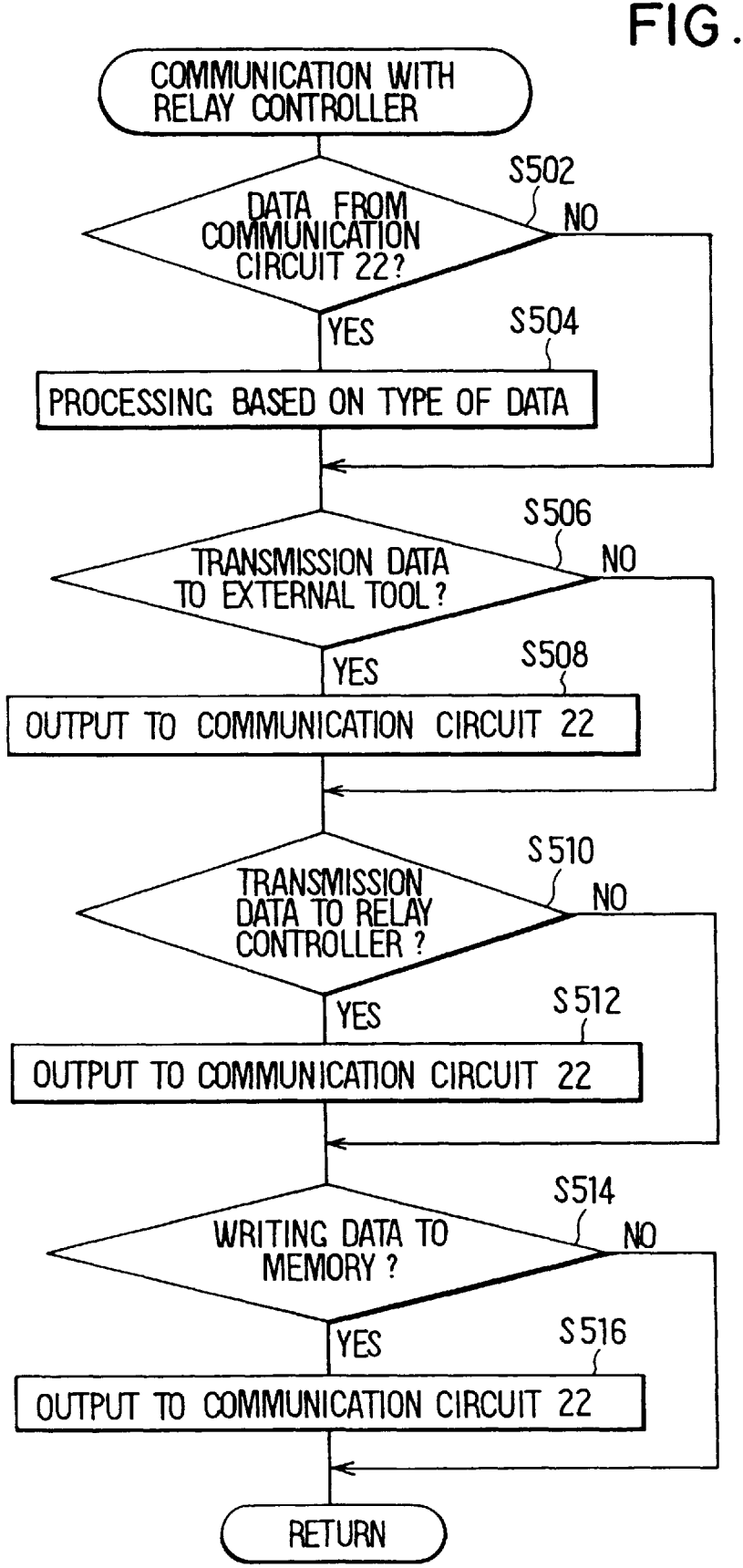
FIG. 7 is a flow chart showing a communication operation of the sub-controller in the embodiment.

In the communication operation S500 shown by a flow chart in FIG. 7, it is to be noted that the communication circuit 22 communicates with the relaying controller 1 based on the predetermined second communication protocol and the data on the serial bus 9 has the second data format.

First, it is checked at step S502 whether the communication circuit 22 has received data from the relaying controller 1. If not received, the process jumps to step S506. If received, the received data is processed based on the type of data. The received data is, as described above, one of the data received from the external tool 7, data from the relaying controller 1 and the data read out from its own storage area in the EEPROM 111.

It is then checked at step S506 whether its own first transmitting register has data to be transmitted to the external tool 7. If it has, it is loaded at step S508 into the communication circuit 22. If it has not, the process advances directly to step S510.

It is checked at step S510, its own second transmitting register has data to be transmitted to the relaying controller 1. If it has, it is loaded at step S512 into the communication circuit 22. If it has not, the process advances directly to step S514.

It is checked at step S514 whether its own third transmitting register has data to be written into its storage area in the EEPROM 111. If it has, it is loaded at step S516 into the communication circuit 22.

From the above construction and operation, it is evident that, in this embodiment, the EEPROM 111 used as a rewritable common non-volatile memory is incorporated into the relaying controller 1 that executes the communications between the external tool and each of the sub-controllers. Thus, the relaying controller 1 and each sub-controller are required only to execute a communication, in response to the access from each sub-controller to the EEPROM 111, based on the same communication protocol and the same communication path as those at the time of the above relaying operation. Although the EEPROM 111 is centralized and the communication between the external tool 7 and each sub-controller is realized, the relaying controller 1 is required only to have a relaying function and non-volatile memory access function. Thus, its circuit construction and control operation are remarkably simplified in comparison with the conventional master-slave distributed processing type control system.

In addition, each sub-controller is not required to have dual combinations of a communication path and a communication circuit. That is, each sub-controller 2, 3, which has one combination of the serial bus 9 for realizing the communication with the relaying controller 1 and the communication circuit 22 for executing the communication, need not have additional combination of a bus for realizing communication with the external tool and a communication circuit for executing the communication. Thus, both the construction and operation are simplified remarkably.

Further, the relaying controller 1 executes only the relaying operation. Therefore, even in the case that the number of sub-controllers or the specification of each sub-controller is changed in dependence on the type of vehicle, the internal specification of the relaying controller 1 is not required to be changed correspondingly.

Still further, the external tool 7 is enabled to execute the communication as if it communicates directly with each sub-controller. Further, as the external tool 7 can be used in the above fully distributed processing, it can be generalized with ease.

Further, as the relaying controller 1 also controls the local device 6, the construction is simplified furthermore.

In the above relaying operation of the relaying controller 1, the data which is addressed to the sub-controller 2 and received by the relaying controller 1 from the serial bus 8 in the first data format may be subjected to the data configuration conversion at any stage of the communication circuit 12, microcomputer 21 and the communication circuit 13. It is however easiest to execute the conversion by the microcomputer 21 from the standpoint of processing. It may be executed during the time period after it is received by the microcomputer 21 from the communication circuit 12 and before it is transmitted to the communication circuit 13.

Other Operation

The external tool 7 sets the operation of the local devices 4–6 as follows by using operations of the relaying controller 1 and each sub-controller.

That is, in order to set the operation of each local device such as local device 4, the external tool 7 transmits setting data, control program and the like to the sub-controller 2, for instance, through the relaying controller 1. The sub-controller 2 transmits the received setting data, control program and the like to the relaying controller 1, which in turn writes the received setting data, control program and the like into the corresponding storage areas of the EEPROM 111.

The relaying controller 1 and each sub-controller operates as follows at the time of turning on the power supply.

Immediately after the power supply is turned on initially or after the power supply is restored from the accidental turning off of the power supply for the controllers, each controller operates as follows.

That is, as soon as the power supply voltage is applied, the relaying controller 1 and each sub-controller execute respective initial settings and start to operate. Thereafter, the relaying controller 1 reads necessary programs and the like from its own storage area in the EEPROM 111 and returns to normal operation.

Each sub-controller, after executing its initial setting, communicates with the relaying controller 1 at a predetermined time point to download the necessary setting data and program from its own storage area of the EEPROM 111.

In the case that the relaying controller 1 cannot accept a new request because of executing the common non-volatile memory managing processing in response to the request from one sub-controller, the relaying controller may notify it to each sub-controller. Thus, each sub-controller is enabled to check whether its request has reached or has been accepted so that a recovery processing may be made by another request after a fixed time period. Thus, each sub-controller can have the same construction.

It is to be noted that, although the communication circuits 12, 13, 22 sequentially receives data to be transmitted from the serial buses 8, 9 or microcomputers 11, 21, the data having been received but not having been transmitted yet is loaded into internal buffer registers in the order of data receiving.

Modification

The data communication operation and order in the above embodiment may be modified without departing from the spirit of the present invention.

For instance, the microcomputer 21 may transmit to the communication circuit 12 or 13, to which the data is addressed, immediately after receiving the data to be relayed.

Figure 8:
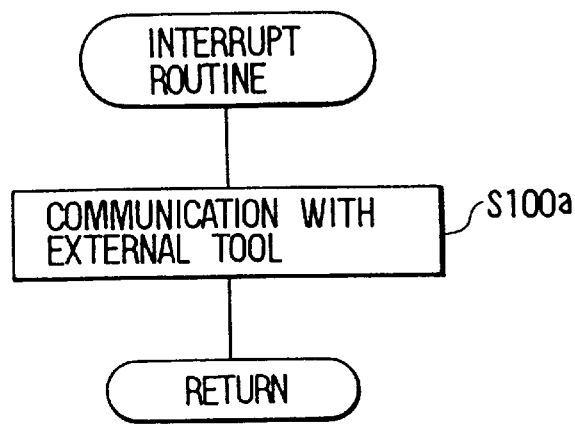
FIG. 8 is a flow chart showing an interrupt routine of the microcomputer of the relaying controller for communicating with the external tool in the embodiment.
Figure 9:
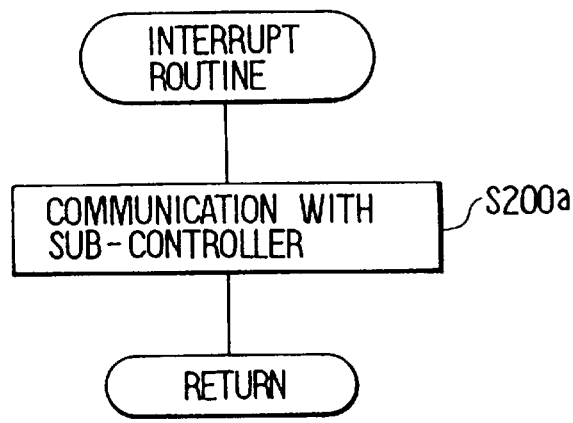
FIG. 9 is a flow chart showing an interrupt routine of the microcomputer of the relaying controller for communicating with the sub-controllers in the embodiment.
Figure 10:
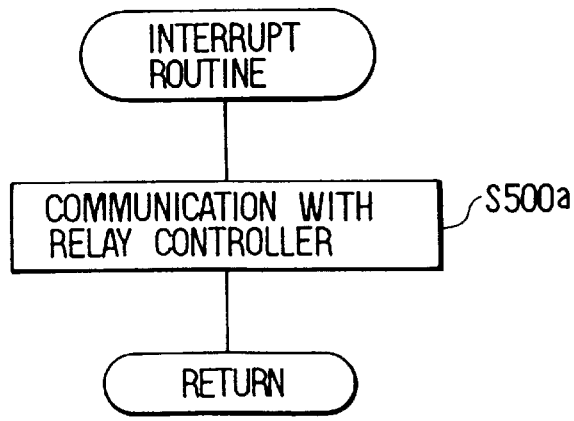
FIG. 10 is a flow chart showing an interrupt routine of the microcomputer of each sub-controller for communicating with the relaying controller in the embodiment.

Further, the communication operation of the communication circuits 12, 13 based on the first communication protocol and second communication protocol may be executed by the microcomputer 11 so that the circuit construction and operation may be simplified. FIGS. 8–10 show those acting operations. As shown in FIG. 8, the microcomputer 11 may execute an interrupt routine for communicating with the external tool 7 at step S100a. This interrupt routine is initiated at a predetermined time interval. As shown in FIG. 9, the microcomputer 11 may execute an interrupt routine for communicating with the sub-controllers at step S200a. This interrupt routine is initiated at a predetermined time interval. As shown in FIG. 10, the microcomputer 11 may execute an interrupt routine for communicating with the relaying controller 1 at step S500a. This interrupt routine is initiated at a predetermined time interval.

Other modification and changes are also possible to the above embodiment without departing from the spirit and scope of the present invention.

We claim:

1. A distributed processing type control system comprising:

a plurality of sub-controllers for controlling individually a plurality of local devices different from each other; and a relaying controller including a rewritable non-volatile memory having predetermined storage areas divided in correspondence with the sub-controllers, the relaying controller being for communicating with an external tool through a first communication path based on a first communication protocol and for communicating with each of the sub-controllers through a second communication path based on a second communication protocol, the relaying controller including data communication relaying means for executing, when receiving a data from the first communication path to be transmitted to the sub-controller, a data configuration conversion of the received data between the communication protocols to transmit the converted data to the second communication path, and for executing, when receiving a data from the second communication path to be transmitted to the external tool, a data configuration conversion of the received data between the communication protocols to transmit the converted data to the first communication path, and the relaying controller including common non-volatile memory managing means for transmitting a stored data in the corresponding storage area of the non-volatile memory to the sub-controller through the second communication path when receiving a memory reading request from the sub-controller, and for writing, when receiving a memory writing request and a writing data from the sub-controller, the writing data in the corresponding storage area of the non-volatile memory.

2. The distributed processing type control system as in claim 1, wherein:

the relaying controller includes local control means for controlling a predetermined local device different from the local devices which is controlled by the sub-controllers.

3. The distributed processing type control system as in claim 2, wherein:

the local control means is a microcomputer including the non-volatile memory therein.

4. The distributed processing type control system as in claim 1, wherein:

the relaying controller includes a first communication circuit connected to the first communication path and a second communication circuit connected to the sub-controllers.

5. The distributed processing type control system as in claim 1, wherein:

the relaying controller includes a microcomputer having the non-volatile memory, and a first and second communication circuits connecting the microcomputer to the first and second communication paths, respectively; and each of the sub-controllers includes a microcomputer having no non-volatile memory, and a communication circuit connecting the microcomputer to the second communication path.

6. The distributed processing type control system as in claim 5, wherein:

the microcomputer in the sub-controller uses data stored in the non-volatile memory in the microcomputer of the relaying controller.

\* \* \* \* \*

UNITED STATES PATENT AND TRADEMARK OFFICE
CERTIFICATE OF CORRECTION

PATENT NO.    : 6,067,612
DATED         : May 23, 2000
INVENTOR(S)   : Sasaki et al.

It is certified that error appears in the above-identified patent and that said Letters Patent is hereby corrected as shown below:

<u>Title page,</u>
Please change "[73] Assignee: Denso Corporation, Kariya, Japan" to
-- [73] Assignee: DENSO Corporation, Kariya, Japan and
Toyota Jidosha Kabushiki Kaisha, Toyota-shi, Japan --

Signed and Sealed this

Seventeenth Day of December, 2002

JAMES E. ROGAN
*Director of the United States Patent and Trademark Office*